United States Patent [19]
Jeglitzka et al.

[11] Patent Number: 4,557,469
[45] Date of Patent: Dec. 10, 1985

[54] WHEEL SUSPENSION SYSTEM

[75] Inventors: Maximilian Jeglitzka; Manfred von der Ohe, both of Stuttgart, Fed. Rep. of Germany

[73] Assignee: Daimler-Benz Aktiengesellschaft, Fed. Rep. of Germany

[21] Appl. No.: 586,134

[22] Filed: Mar. 5, 1984

[30] Foreign Application Priority Data

Feb. 14, 1984 [DE] Fed. Rep. of Germany ....... 3405174

[51] Int. Cl.⁴ ...................... B60G 11/16; B60G 15/06
[52] U.S. Cl. ................................. 267/20 A; 267/61 R; 280/666
[58] Field of Search ............ 267/8 R, 8 B, 8 C, 20 R, 267/20 A, 20 C, 60, 61 R, 61 S, 62, 166, 173, 174, 178, 179, 180; 280/666, 696, 701

[56] References Cited

U.S. PATENT DOCUMENTS 1,386,855  8/1921  Ewing .............................. 267/180 X
2,578,137 12/1951  Janeway ........................... 267/20 A
2,578,138 12/1951  Janeway et al. ..................... 267/8 R
2,865,651 12/1958  Chayne et al. ....................... 280/670

FOREIGN PATENT DOCUMENTS 2431675  1/1976  Fed. Rep. of Germany .
3046327  7/1982  Fed. Rep. of Germany .
3342355  5/1984  Fed. Rep. of Germany .
3342519  5/1984  Fed. Rep. of Germany .
3405173  9/1984  Fed. Rep. of Germany .
1573273  7/1969  France .
2297150  8/1976  France .

Primary Examiner—Bruce H. Stoner, Jr.
Assistant Examiner—Richard R. Diefendorf
Attorney, Agent, or Firm—Barnes & Thornburg

[57] ABSTRACT

In wheel suspensions for automotive vehicles, equipped with a wheel suspension system comprising a coil spring, a specific mutual association can be desirable for functional reasons for the individual components of the wheel suspension, forcing constructional compromises in connection with other structural conditions inherent in the design of the vehicle. In order to be able to avoid in such cases expensive compromise solutions, it is disclosed to form the coil spring of two series-connected individual spring ends mutually supported against each other by way of a bridge member, at a spacing from one or several vehicle components.

14 Claims, 4 Drawing Figures

WHEEL SUSPENSION SYSTEM

BACKGROUND AND SUMMARY OF THE INVENTION

The invention relates to a wheel suspension for automotive vehicles, with at least one wheel control member, with a wheel suspension system comprising a coil spring, and with at least one vehicle component arranged in the surrounding area of the coil spring.

In wheel suspensions of this type, the space is frequently very restricted. However, in most cases a quite specific arrangement is desirable for the individual parts of the wheel suspension, for functional reasons. This oftentimes forces compromises in conjunction with other constructional conditions resulting from the design of the vehicle.

Thus, for example, French Pat. No. 1,573,273 concerns a wheel suspension of the general type referred to above, wherein the coil spring is in the way of the axle shaft and is therefore supported on the wheel control member by way of a special bracket bridging the axle shaft. Consequently, this construction requires a special bridging member, the manufacture and mounting of which causes additional expenses.

In another conventional wheel suspension described in German published unexamined patent application (DOS) No. 2,431,675, the coil spring of the spring leg is to be supported on the damper thereof above the vehicle wheel. This structural solution, however, requires a large construction height of the spring leg, counteracting, for example in case of front axles, the tendency of placing the contours of the engine hood increasingly lower.

Thus, a great variety of compromises have been made, namely in constructional as well as functional viewpoints (for example with respect to spring ratio), wherein corresponding problems are encountered precisely in connection with the arrangement of coil springs because these require a large amount of space.

Special difficulties also are experienced, if an already designed vehicle is to be retrofitted, for example, from rear wheel drive to front wheel drive or four wheel drive, or is to be equipped with coil springs of different size for roadway and terrain.

Therefore, an object of the invention is to provide a wheel suspension of the type discussed hereinabove which permits a construction adaptable to a great variety of different requirements in an especially advantageous way.

This object is achieved according to the invention by providing that the coil spring is formed by two series-connected individual springs which are arranged with their vertically facing spring ends supported against each other by way of a bridge member disposed at a spacing from the vehicle component.

The subdivision of the coil spring according to this invention into two series-connected individual springs makes it possible to design the two individual springs in their length so that they will terminate respectively at a spacing from the vehicle component in the zone where this vehicle component will pass through the enveloping surface (axial projection surface) of the coil spring. By means of the bridge member arranged laterally of the vehicle component, the two springs mutually support each other. The coil spring accordingly forms a tandem spring.

In this connection, the invention contemplates respective arrangements where the vehicle component enters with only a part or with its entire cross section between the two individual springs.

The size of the spacing of the two individual springs from each other is selected so that the vehicle component is at a spacing with respect to the spring ends which ensures that, at maximally possible spring strokes, any contact between the spring ends and the vehicle component is precluded.

The invention provides a compact construction and yet makes available maximum room for spring windings. The invention furthermore makes it possible to equip vehicles designed for rear wheel drive to front wheel drive or to change the coil springs to those having a larger diameter, without having to alter the support on the body side of the coil springs of the front axle.

According to preferred embodiments of the invention, the vehicle component may be any part to be accommodated in the area of a wheel suspension, such as part of the wheel control system, for example a strut or a control arm, one or several pipelines, e.g. exhaust pipes, an axle shaft, a body part, or a wheel.

Furthermore, various vehicle components can simultaneously enter between the two individual springs or can be passed therethrough. Also embodiments are contemplated wherein the coil spring is provided in the upright position as well as in a horizontal position.

In one preferred embodiment of the invention, it is provided that the respective final turns of the spring ends of the individual springs oriented toward the vehicle component exhibit a turn end portion angled essentially in parallel to the spring axis in the direction of the other individual spring; and wherein both turn end portions are held in mutual alignment under pretensioning in the bridge member means, said bridge member means being arranged laterally of the vehicle component between these end portions. In this case, mounting of the spring end turns on the bridge member can be dispensed with. According to a further feature of certain such embodiments, the spring end turns are held in a self-centering seating on the bridge member, which can be realized in a favorable fashion by providing that the mutually facing turn end portions terminate conically and engage into recesses of the bridge member means which are complimentary to the conicity of the end portions, said bridge member means being in the manner of a sleeve.

In certain preferred embodiments of the invention it is provided that the bridge member means is of a U-shape; and wherein the final turn of each spring end of both individual springs facing the vehicle component is respectively supported on one of the two U-legs of the bridge member means which bridge member means surrounds the vehicle component at a radial spacing. This construction provides an especially simple mounting of the U-shaped bridge member which, for this purpose, can be inserted, while encompassing the component, with its U-legs between the spring ends of the two individual springs. According to a further advantageous feature of certain embodiments, it is provided that the respective final turns of the two spring ends oriented toward the vehicle component are fixed at last in the radial direction on the U-legs of the bridge member means.

Further objects, features, and advantages of the present invention will become more apparent from the following description when taken with the accompanying drawings which show, for purposes of illustration only, embodiments in accordance with the present invention.

DETAILED DESCRIPTION OF THE DRAWINGS

Figure 1:
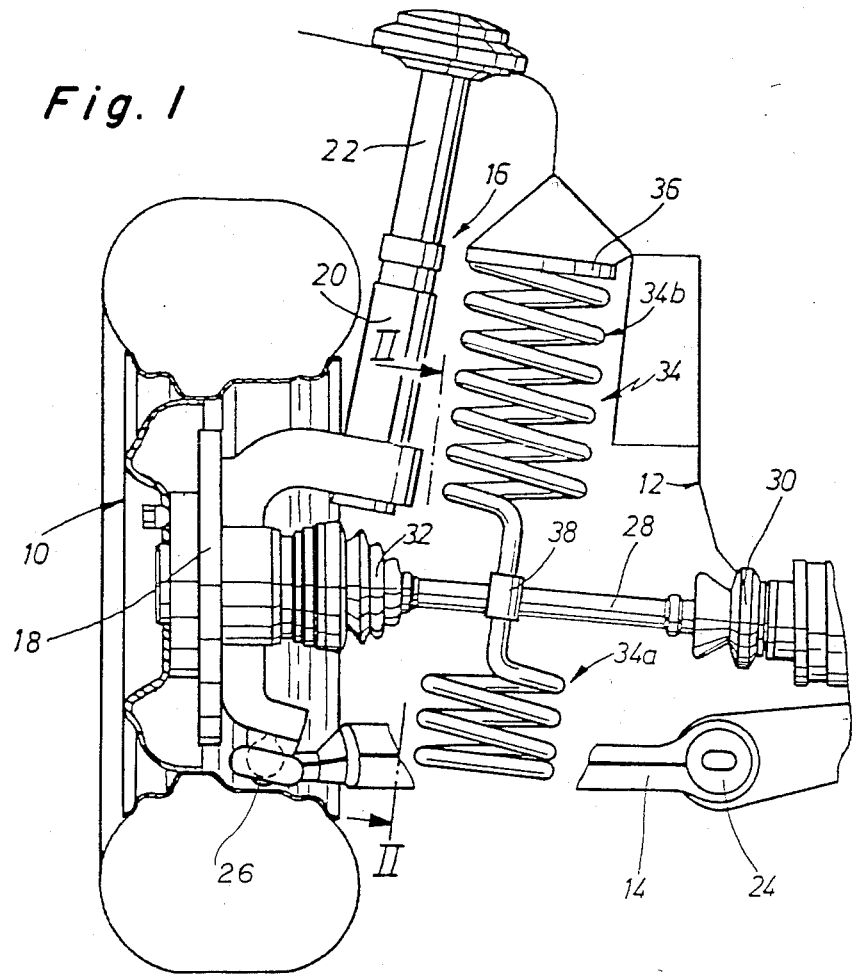
FIG. 1 is a schematic rear view of a wheel suspension designed as an independent wheel suspension, equipped with a first embodiment of a coil spring constructed in accordance with the present invention, the wheel being illustrated in cross section.

The independent wheel suspension shown in FIG. 1 serves, for example, for the support and control of a drivable rear wheel 10 of an automotive vehicle, conventionally guided at the vehicle body, denoted by 12 in its entirety, for example, with the aid of a lower transverse control arm 14 and a damper leg 16, known per se.

For this purpose, a wheel carrier 18 supporting the rear wheel 10 is held nonrotationally in a manner known per se at the lower end of an external tube 20 of the damper leg 16, the piston rod 22 of this damper leg being elastically supported at the vehicle body 12.

The transverse control arm 14 is pivotally mounted, on the one hand, preferably with the interposition of a rubber element, in a joint 24 provided at the vehicle body 12 and, on the other hand, is articulated to the wheel carrier 18 by means of a ball joint 26.

The rear wheel 10 is driven by way of an axle shaft 28, arranged at a spacing above the transverse control arm 14 and extending transversely to the longitudinal axis of the vehicle; this axle shaft is provided conventionally with respectively one joint 30 and 32 on the side of the wheel and on the side of the drive assembly.

Number 34 denotes a coil spring in its entirety, this coil spring being arranged, as seen in the longitudinal direction of the vehicle, between the damper leg 16 and the joint 24 of the transverse control arm 14 on the vehicle body side, in such a way that the coil spring covers, in top view, the axle shaft 28.

The coil spring 34 is made up of two individual springs 34a and 34b which are mutually supported against each other, which will be described in detail below.

The coil spring is furthermore supported at the bottom on the wheel control member constituted by the transverse control arm 15 and at the top on the vehicle body. For this purpose, the vehicle body includes a preferably articulated supporting member 36 fashioned, for example, in the manner of a plate spring. The lower end of the coil spring is fixed in the radial direction at the transverse control arm 14, for example in a cup-shaped depression, which is not illustrated in detail. The coil spring 34, however, can also be directly supported at the vehicle body at the top. The above-described arrangement of the coil spring 34 requires a feature to be able to advantageously provide its lower support on the transverse control arm 14, without additional auxiliary means, with respect to a vehicle component intersecting the coil spring 34, in the form of the axle shaft 28.

For this purpose, the coil spring 34 is made up of two individual springs 34a and 34b which are series-connected and are arranged with the spring ends facing the axle shaft 28 at a radial spacing from the latter. These individual springs are supported against each other by means of a bridge member 38 provided between the two individual springs 34a and 34b and laterally at the axle shaft 28.

Figure 2:
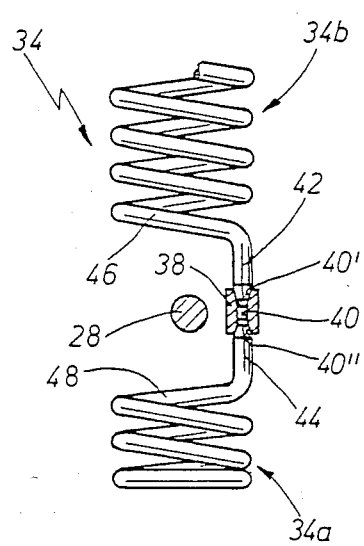
FIG. 2 is a side view which shows the coil spring of FIG. 1 in an enlarged view taken along line II—II of FIG. 1.

As is clearly shown in FIG. 2, the bridge member 38 is fashioned in the manner of a sleeve penetrated axially by a bore 40. The bore 40 flares conically toward the outside on both bore end sections 40' and 40''. The sleeve is also fashioned to be correspondingly bending-resistant.

The end portions 42 and 44 of the two individual spring end turns 46' and 48', respectively facing the axle shaft 28, are bent in such a way that they are oriented toward each other and are in shape-mating engagement under pretensioning with the conical bore end portions 40' and 40''. For this purpose, a corresponding adaptation of the length of the bridge member 38 is provided.

In order to attain a suitable pretensioning, the bridge member can be made advantageously also of two coaxial sections which can be threadedly connected and make it possible by mutual twisting to change the axial length of the bridge member according to other preferred embodiments of the invention.

Figure 3:
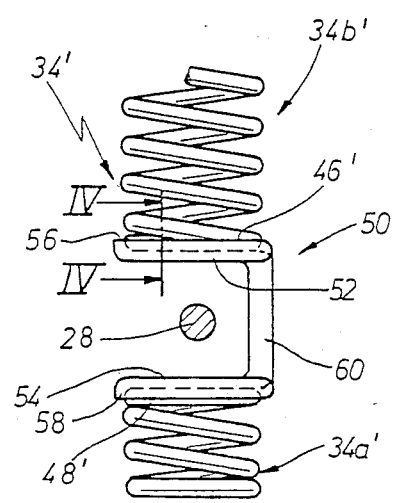
FIG. 3 is a side view similar to FIG. 2 which shows a second embodiment of a coil spring for a wheel suspension.

The embodiment of a coil spring 34' according to FIG. 3 differs from the above-disclosed coil spring construction with respect to the design of its bridge member 50. Bridge member 50 is of a U-shape and encompasses or bypasses at a corresponding radial spacing, the axle shaft 28 in such a way that respectively one of its axial legs 52 and 54 is supported on the final turn 46' and 48', respectively, of the two individual springs 34a' and 34b'.

Figure 4:
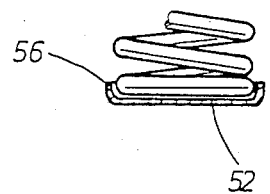
FIG. 4 shows a partial sectional view along line IV—IV of FIG. 3.

As can be seen from FIGS. 3 and 4, the U-legs 52 and 54 are equipped along their longitudinal sides with a continuous, outwardly oriented ridge 56 and 58, respectively, so that the spring end turns 46' and 48' are secured in the radial direction at the bridge member 50, except in the direction of the connecting web 60, joining the U-legs 52 and 54 with each other.

Advantageously, the U-legs 52 and 54 are slightly inclined toward each other so that also in the direction of the connecting base 60 a radial fixation is achieved.

The spacing of the two U-legs 52 and 54 of the bridge member 50 is to be selected so that the axle shaft 28 cannot come into contact therewith even upon maximum vertical swinging movements.

The bridge member 50 preferably constitutes a forged shape component and can be advantageously mounted by inserting same, with its connecting base 60 leading, in between the two final turns 46' and 48' of the partial springs 34a' and 34b'.

In an advantageous modification of the above-explained spring constructions, it is contemplated, in correspondence with the constructional conditions, to make the number of turns in both individual springs and/or their turn diameters and/or their spring lead differently large. Likewise, the flexural resiliences (spring constants) of both individual springs can differ from each other.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Coil spring arrangement for vehicle wheel suspension system of the type having:

a wheel control member; and a wheel suspension system including a coil spring means and a vehicle component disposed adjacent said spring means, said spring means having more than two spring turns, wherein said spring means is configured to permit said vehicle component to penetrate between said spring turns into the area of an axial projection of said spring means while preventing said component from touching said spring turns as said vehicle component traverses through said axial projection, said coil spring arrangement comprising:

two series connected individual springs forming said coil spring means, which are arranged with mutually facing turn ends supported against each other by way of a bridge member means, wherein said coil spring means together with said bridge member means are at a spacing from said vehicle component, whereby said vehicle component can extend uninterrupted through said axial projection formed by said series connected springs.

2. An arrangement according to claim 1, wherein final turns of the spring ends of the individual springs oriented toward the vehicle component exhibit turn end portions angled essentially in parallel to the spring axis in the directions of each other; and wherein both turn end portions are held in mutual alignment in a pretensioning manner within the bridge member means, said bridge member means being arranged laterally of said vehicle component between these end portions.

3. An arrangement according to claim 2, wherein the mutually aligned turn end portions terminate conically and engage into recesses of the bridge member means which are complementary to the conicity of the end portions, said bridge member means forming a sleeve.

4. An arrangement according to claim 1, wherein the bridge member means includes a pair of U-shaped legs; and wherein a final turn of each spring end of both individual springs facing the vehicle component is respectively supported on one of the two U-shaped legs of the bridge member means, which bridge member means surrounds the vehicle component at a radial spacing.

5. An arrangement according to claim 4, wherein the respective final turns of each spring end oriented toward the vehicle component are fixed at least in the radial direction on the U-shaped legs of the bridge member means.

6. An arrangement according to claim 5, wherein the spring constants of the two individual springs are different.

7. An arrangement according to claim 6, wherein the turn diameter of the two individual springs are different.

8. An arrangement according to claim 6, wherein the number of turns of the two individual springs are different.

9. An arrangement according to claim 1, wherein the spring constants of the two individual springs are different.

10. An arrangement according to claim 9, wherein leads of the two individual springs have different magnitudes.

11. An arrangement according to claim 1, wherein leads of the two individual springs have different magnitudes.

12. An arrangement according to claim 1, wherein said vehicle component is a wheel axle shaft.

13. An arrangement according to claim 1, wherein the turn diameter of the two individual springs are different.

14. An arrangement according to claim 1, wherein the number of turns of the two individual springs are different.

* * * * *